United States Patent
Edler et al.

(10) Patent No.: US 10,774,912 B2
(45) Date of Patent: Sep. 15, 2020

(54) ELECTRONIC LIMITED SLIP COUPLING HAVING BOLT ON CONFIGURATION

(71) Applicant: Eaton Intelligent Power Limited, Dublin (IE)

(72) Inventors: Andrew N. Edler, Homer, MI (US); Randal James Graves, Elkton, MD (US); Jeffrey A. Oesch, Roseville, MI (US)

(73) Assignee: Eaton Intelligent Power Limited, Dublin (IE)

( * ) Notice: Subject to any disclaimer, the term of this patent is extended or adjusted under 35 U.S.C. 154(b) by 37 days.

(21) Appl. No.: 16/270,023

(22) Filed: Feb. 7, 2019

(65) Prior Publication Data

US 2019/0170234 A1 Jun. 6, 2019

Related U.S. Application Data

(63) Continuation of application No. PCT/US2017/046299, filed on Aug. 10, 2017.

(Continued)

(51) Int. Cl.
*F16H 48/22* (2006.01)
*F16H 48/34* (2012.01)
*F16H 57/04* (2010.01)

(52) U.S. Cl.
CPC ............ *F16H 48/34* (2013.01); *F16H 48/22* (2013.01); *F16H 57/0473* (2013.01); *F16H 57/0483* (2013.01)

(58) Field of Classification Search
CPC ...... F16H 48/34; F16H 48/22; F16H 57/0483; F16H 57/0473
See application file for complete search history.

(56) References Cited

U.S. PATENT DOCUMENTS 9,163,715 B2 * 10/2015 Valente .................. F16D 13/74
2006/0163018 A1 * 7/2006 Ekonen .................. F16D 28/00
192/35

(Continued)

FOREIGN PATENT DOCUMENTS

WO 2015041917 A1 3/2015

OTHER PUBLICATIONS

International Search Report and Written Opinion for International Application No. PCT/US2017/046299 dated Nov. 23, 2017, 15 pages.

*Primary Examiner* — David J Hlavka
(74) *Attorney, Agent, or Firm* — RMCK Law Group PLC

(57) ABSTRACT

An electronic limited slip coupling constructed in accordance to one example of the present disclosure includes a sleeve, a support shaft, a hydraulic control unit, a clutch assembly and a case. The sleeve has a first set of splines projecting inwardly and meshed for engagement with an axle. The support shaft has a second set of splines configured to mesh with a first housing of a differential assembly. The hydraulic control unit has an accumulator housing and a motor. The motor is configured to pump fluid into an accumulator chamber of the accumulator housing. The clutch assembly receives fluid from the hydraulic control unit. The clutch assembly has a clutch pack positioned between a clutch piston and a portion of a clutch basket. The clutch assembly is operable to selectively interlock the sleeve and the support shaft. The case supports the electronic limited slip coupling as an assembled unit.

16 Claims, 5 Drawing Sheets

Related U.S. Application Data

(60) Provisional application No. 62/373,344, filed on Aug. 10, 2016.

(56) References Cited

U.S. PATENT DOCUMENTS

| | | | |
|---|---|---|---|
| 2006/0169564 A1* | 8/2006 | Krisher | B60K 17/3462 |
| | | | 192/85.53 |
| 2007/0004548 A1 | 1/2007 | Bai | |
| 2015/0057124 A1 | 2/2015 | Pump | |
| 2016/0312880 A1* | 10/2016 | Nielsen | F16H 57/0424 |

\* cited by examiner

ELECTRONIC LIMITED SLIP COUPLING HAVING BOLT ON CONFIGURATION

CROSS-REFERENCE TO RELATED APPLICATIONS

This application is a continuation of International Application No. PCT/US2017/046299 filed Aug. 10, 2017, which claims the benefit of U.S. Patent Application No. 62/373,344 filed on Aug. 10, 2016. The disclosure of the above application is incorporated herein by reference.

FIELD

The present disclosure relates generally to limited slip differentials and more particularly to a bolt on coupling for use with a limited slip differential.

BACKGROUND

Differentials are provided on vehicles to permit an outer drive wheel to rotate faster than an inner drive wheel during cornering as both drive wheels continue to receive power from the engine. While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials were developed to shift power from the drive wheel that has lost traction and is spinning to the drive wheel that is not spinning.

Electronically-controlled, limited-slip differentials can include a hydraulically actuated clutch to limit differential rotation between output shafts of the differential. In some configurations a hydraulic delivery device may be located remote from the differential. In some examples it is challenging to mount the hydraulic delivery device relative to the differential and/or housing that accepts the differential. Further, it can be challenging to connect the hydraulic coupling between the hydraulic delivery device and the limited-slip differential.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An electronic limited slip coupling constructed in accordance to one example of the present disclosure includes a sleeve, a support shaft, a hydraulic control unit, a clutch assembly and a case. The sleeve has a first set of splines projecting inwardly and meshed for engagement with an axle. The support shaft has a second set of splines configured to mesh with a first housing of a differential assembly. The hydraulic control unit has an accumulator housing portion and a motor. The accumulator housing portion houses a biasing assembly and an accumulator piston. The accumulator housing forms an accumulator chamber with the accumulator piston. The motor is configured to pump fluid into the accumulator chamber of the accumulator housing portion. The clutch assembly receives fluid from the hydraulic control unit. The clutch assembly has a clutch pack positioned between a clutch piston and a portion of a clutch basket. The clutch assembly is operable to selectively interlock the sleeve and the support shaft. The case supports the electronic limited slip coupling as an assembled unit. The case has a flange that defines apertures for receiving fasteners that threadably couple the electronic limited slip coupling to one of a front transfer case and a front transmission.

According to additional features, the clutch basket is fixed for rotation with the support shaft and at least partially encircling the sleeve. The clutch pack includes a first subset of plates fixed for rotation with the sleeve and a second subset of plates fixed for rotation with the clutch basket. Movement of the clutch piston urges the clutch pack against a portion of the clutch basket. The clutch basket and the support shaft are interconnected through a third set of splines defined by the clutch basket and a fourth set of splines defined by the support shaft.

In other features, fluid pumped into the accumulator housing portion at least partially collapses the biasing assembly and introduces a pre-charge into the hydraulic control unit. The biasing assembly is configured to expand and urge the accumulator piston in a first direction resulting in fluid being communicated from the hydraulic control unit and into the clutch assembly. One of the front transaxle and front transmission is configured for use in one of a front wheel drive vehicle and all-wheel drive vehicle. A second housing encloses the first housing. The axle extends from a first end inside both of the first housing and the second housing to a second end spaced from an interior cavity of the second housing. The sleeve defines a sleeve aperture centered on and extending along an axis defined by the axle.

An electronic limited slip coupling constructed in accordance to another example of the present disclosure includes an axle shaft, a sleeve, a support shaft, a hydraulic control unit, a clutch assembly and a case. The axle shaft extends along an axle axis and is configured to meshingly engage a side gear of a differential assembly. The sleeve has a first set of splines projecting inwardly and meshed for engagement with an axle. The support shaft has a second set of splines configured to mesh with a first housing of a differential assembly. The hydraulic control unit has an accumulator housing portion and a motor. The accumulator housing portion houses a biasing assembly and an accumulator piston. The accumulator housing forms an accumulator chamber with the accumulator piston. Fluid that is pumped into the accumulator housing portion at least partially collapses the biasing assembly and introduces a pre-charge into the hydraulic control unit. The biasing assembly is configured to expand and urge the accumulator piston in a first direction resulting in fluid being communicated from the hydraulic control unit and into the clutch assembly. The motor is configured to pump fluid into the accumulator chamber of the accumulator housing portion. The clutch assembly receives fluid from the hydraulic control unit. The clutch assembly has a clutch pack operable to selectively interlock the sleeve and the support shaft. The case supports the electronic limited slip coupling as an assembled unit. The case has a flange that defines apertures for receiving fasteners that threadably couple the electronic limited slip coupling to one of a front transfer case and a front transmission.

According to additional features, the clutch pack includes a first subset of plates fixed for rotation with the sleeve and a second subset of plates fixed for rotation with the clutch basket. The clutch assembly further comprises a clutch piston that urges the clutch pack against a portion of the clutch basket upon delivery of fluid from the hydraulic control unit. The clutch basket and the support shaft are interconnected through a third set of splines defined by the clutch basket and a fourth set of splines defined by the support shaft. One of the front transaxle and the front transmission is configured for use in one of a front wheel drive vehicle and an all-wheel drive vehicle.

In other features, the electronic limited slip coupling can include a second housing that encloses the first housing. The axle extends from a first end inside both of the first housing and the second housing to a second end spaced from an interior cavity of the second housing. The sleeve defines a sleeve aperture centered on and extending along the axle axis.

BRIEF DESCRIPTION OF THE DRAWINGS

The present disclosure will become more fully understood from the detailed description and the accompanying drawings, wherein.

DETAILED DESCRIPTION

Figure 1:
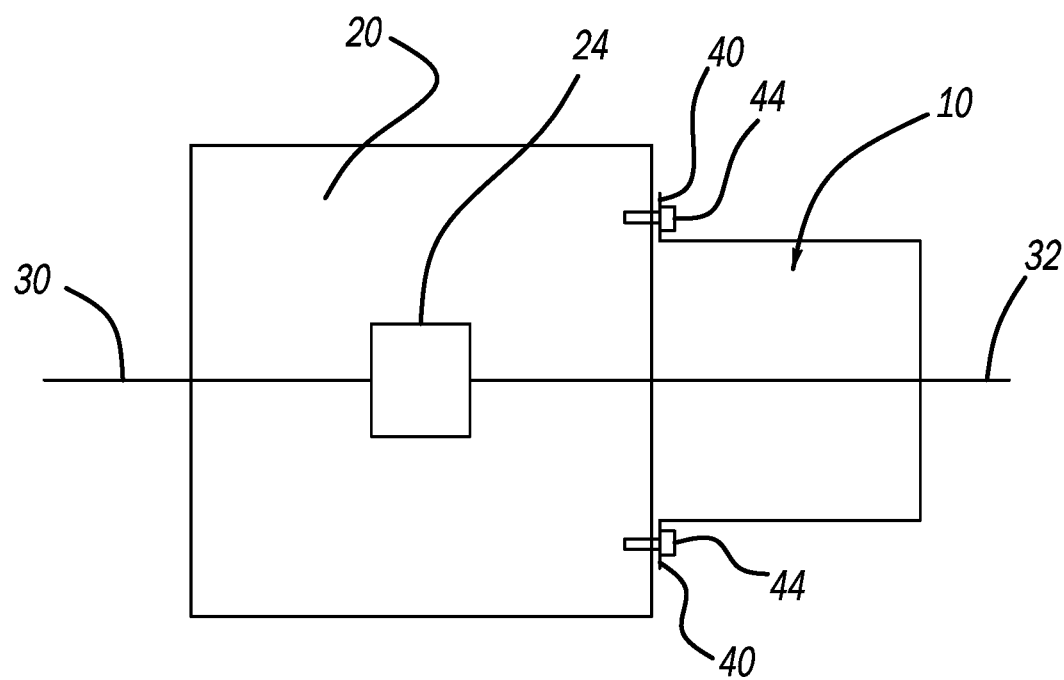
FIG. 1 is a schematic view of an electronic limited slip coupling configured for use with a differential and bolted onto a transaxle housing.
Figure 2:
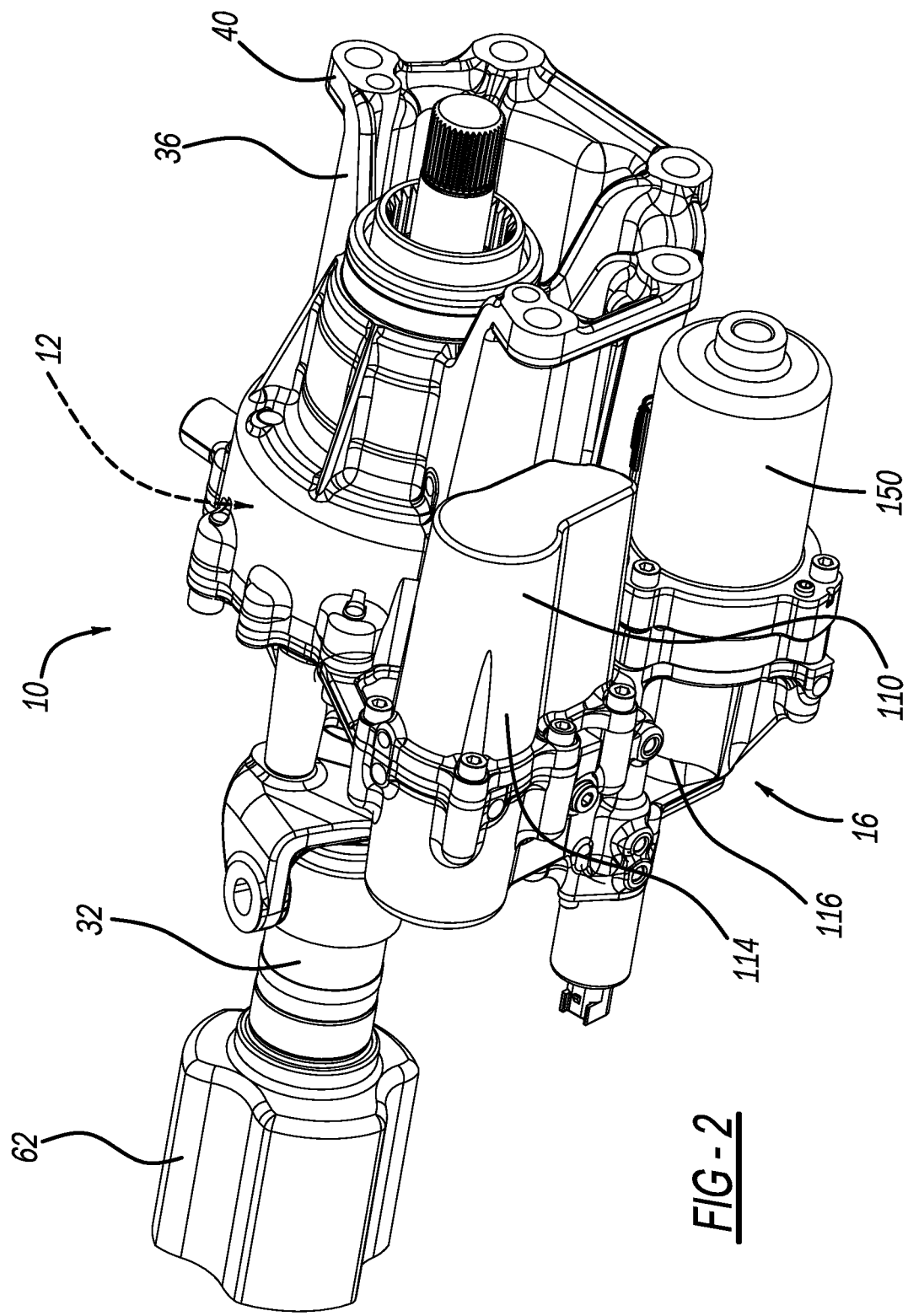
FIG. 2 is a first perspective view of the electronic limited slip coupling of FIG. 1.
Figure 3:
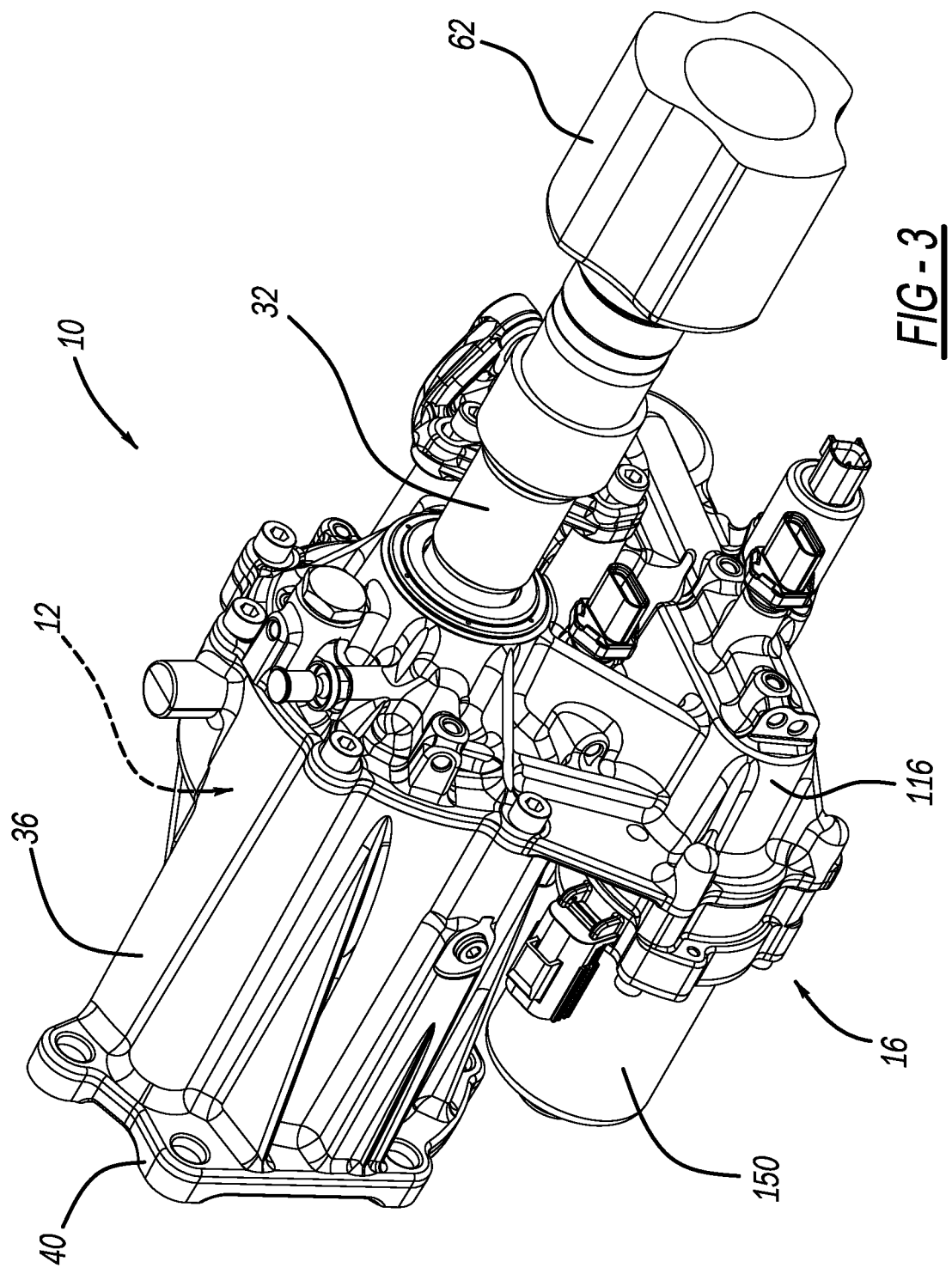
FIG. 3 is a second perspective view of the electronic limited slip coupling of FIG. 1.

With initial reference to FIGS. 1-3, an electronic limited slip coupling constructed in accordance to one example of the present disclosure is shown and generally identified at reference 10. As will be described herein, the electronic limited slip coupling 10 provides a fully integrated unit having a clutch assembly 12, and hydraulic control unit 16 that bolts onto a front transfer case or front transmission 20. The electronic limited slip coupling 10 interacts between a differential assembly 24 and a pair of axle shafts 30, 32. The electronic limited slip coupling 10 includes a case 36 having a flange 40 that defines apertures 42 for receiving bolts (or other suitable fasteners) 44 that threadably couple the electronic limited slip coupling 10 to the front transfer case 20. The case 36 supports the electronic limited slip coupling 10 as an assembled unit. The electronic limited slip coupling 10 and the differential assembly 24 can collectively comprise an electronic limited slip differential assembly 48.

In the examples shown, the electronic limited slip coupling 10 can be for a front wheel drive vehicle or an all-wheel drive vehicle. The electronic limited slip coupling 10 can be configured for use with an automatic transmission or a manual transmission. The configuration allows for simple assembly and setup.

The electronic limited slip differential assembly 48 can function as a traditional open differential during normal operating conditions through the differential assembly 24. When an event occurs in which a bias torque is required, such as when a loss in traction at one of the wheels connected with the axles 30, 32 is detected or anticipated, the clutch assembly 12 of the electronic limited slip coupling 10 can be selectively actuated in order to generate the optimum bias ratio for the situation.

Figure 4:
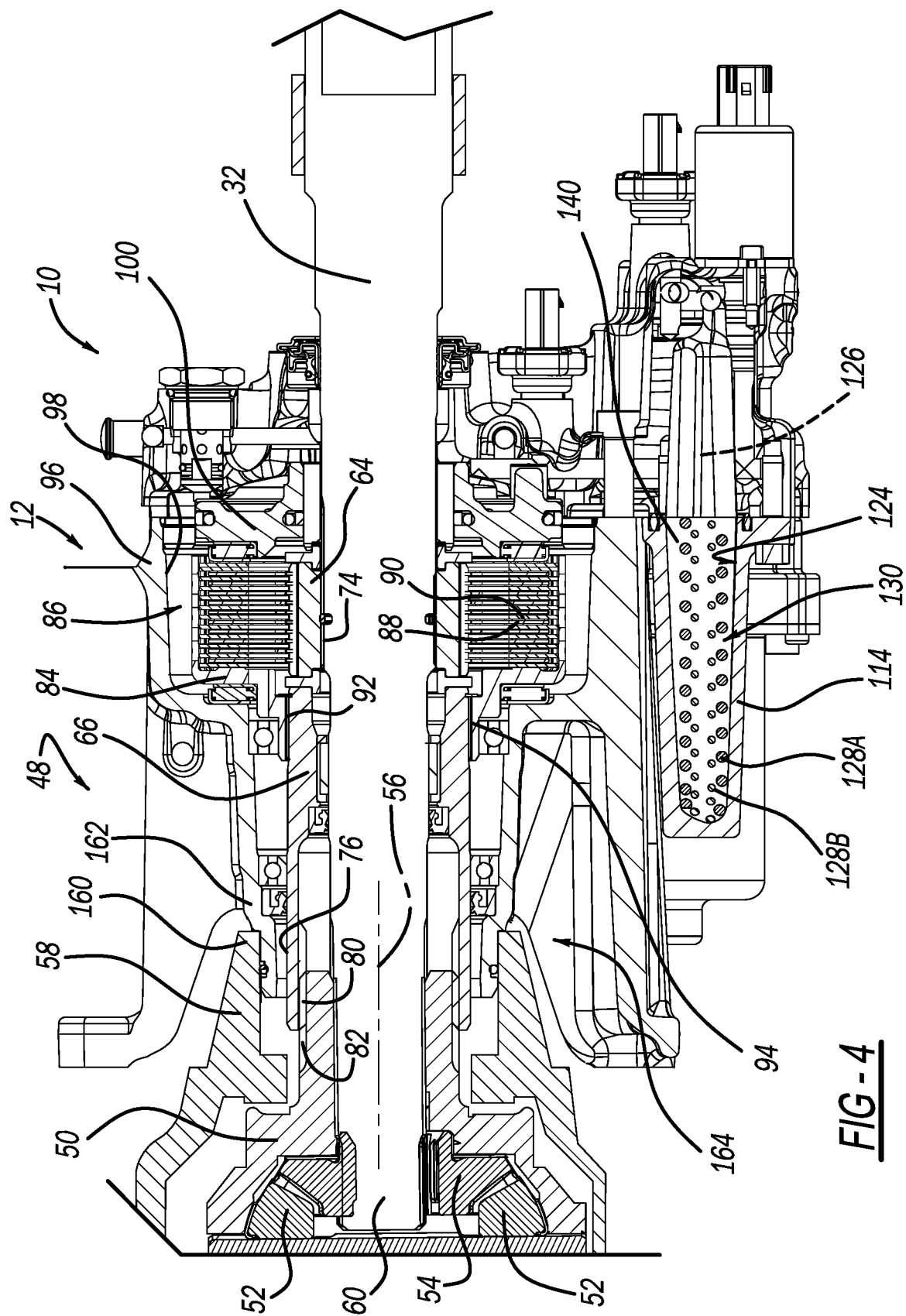
FIG. 4 is a sectional view of the electronic limited slip coupling and shown coupled to an exemplary differential assembly.
Figure 5:
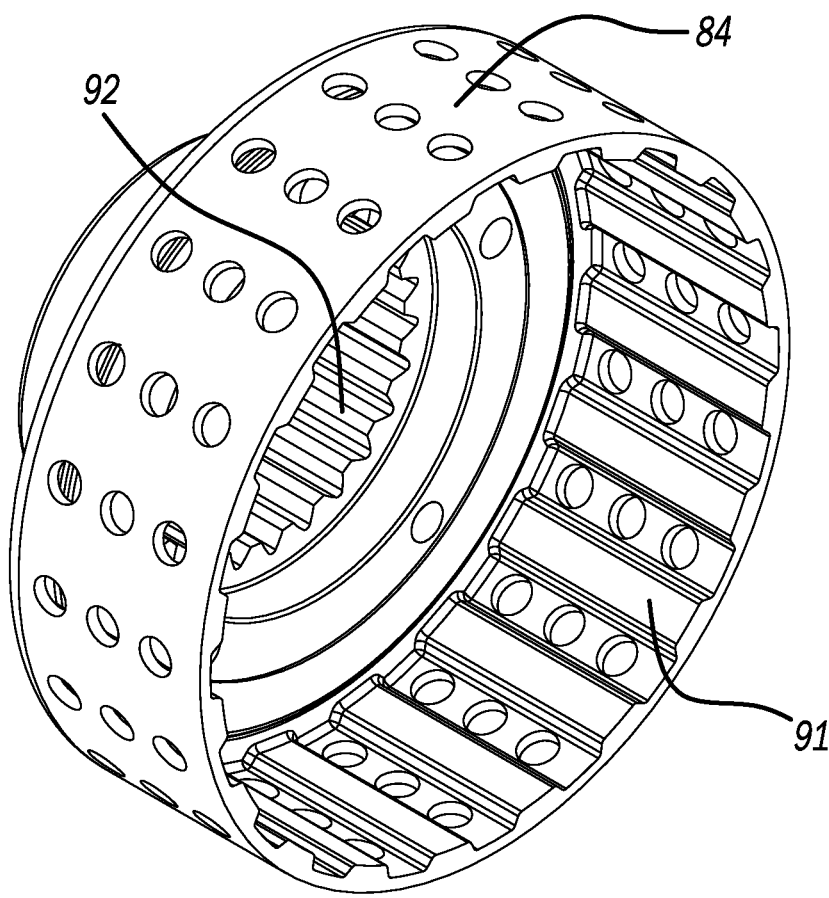
FIG. 5 is a perspective view of a clutch basket of the electronic limited slip coupling of FIG. 2.

With additional reference now to FIG. 4, the differential assembly 24 can include a ring gear (not shown), a first housing 50, a plurality of pinion gears 52, and at least one side gear 54. The first housing 50 can be rotatable about an axis 56. Rotary output from a transmission can be transmitted to the ring gear through the vehicle's drive shaft and a bevel gear. The first housing 50, or crank case, can be meshed with the ring gear for concurrent rotation. The plurality of pinion gears 52 can be positioned in the first housing 50 and can be driven in rotation by the first housing 50. Each of the plurality of pinion gears 52 can be mounted on posts fixed to the first housing 50. The at least one side gear 54 can be meshed with at least some of the pinion gears 52. The axle 32 can extend along the axis 56 and can be fixed to the at least one side gear 54 for concurrent rotation about the axis 56.

Figure 6:
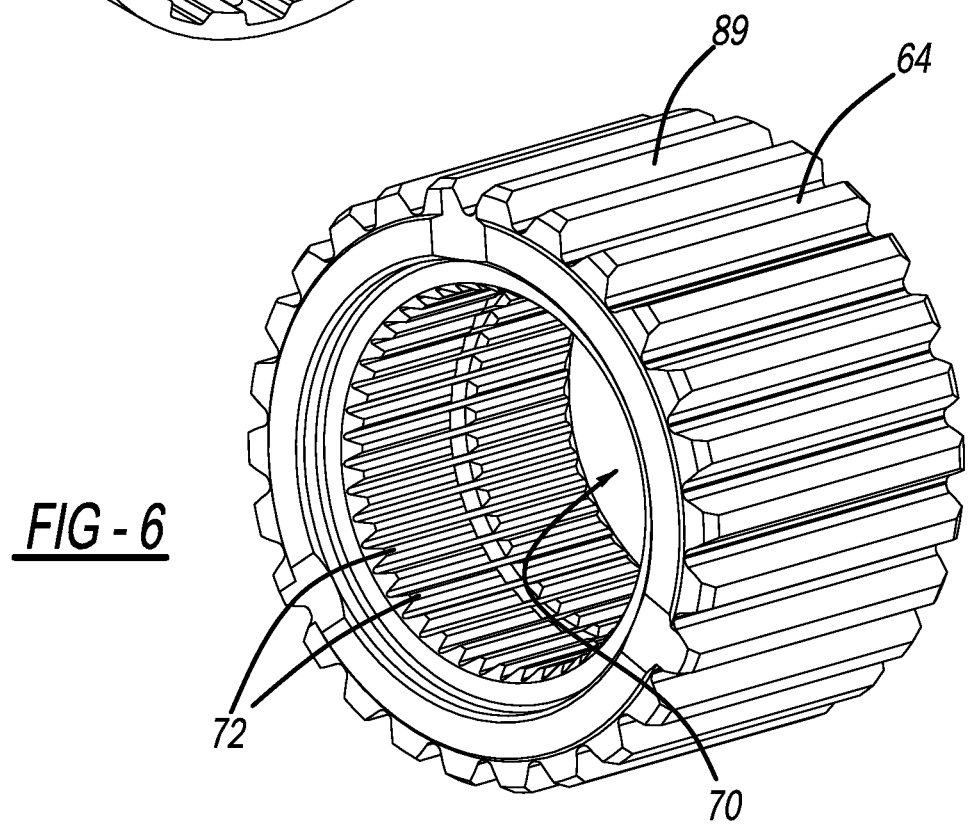
FIG. 6 is a perspective view of a sleeve of the electronic limited slip coupling of FIG. 2.

A second housing 58 encloses the first housing 50, the plurality of pinion gears 52 and the at least one side gear 54. The axle 32 can extend from a first end 60 inside both of the first housing 50 and the second housing 58 to a second end 62 (FIG. 2) spaced from an interior cavity of the second housing 58. The electronic limited slip coupling 10 can include a sleeve 64, a support shaft 66, and a clutch assembly 68. The sleeve 64 can have a sleeve aperture 70 (FIG. 6) centered on and extending along the axis 56. The sleeve 64 can also have a first set of splines 72 projecting inwardly from the sleeve aperture 70. The first set of splines 72 can engage the axle 32 through a second set of splines 74 projecting from the axle 32. The sleeve 64 and the axle 32 can thus be fixed for rotation together.

The support shaft 66 can project into the second housing 58 and have an outer surface 76. The support shaft 66 can also have a support shaft aperture 78 centered on and extending along the axis 56. The support shaft 66 can also have a third set of splines 80 projecting from the outer surface 76. The support shaft 66 can be adjacent to the sleeve 64 along the axis 56 and be operable to encircle and freely rotate relative to the axle 32. The third set of splines 80 can engage the first housing 50 through a fourth set of splines 82 projecting from the first housing 50.

The clutch assembly 12 can operate in an open configuration to allow the side gears to rotate independently from each other, e.g., at different speeds. The clutch assembly 12 can also operate in a closed or partially closed configuration where the side gears rotate together or partially together (that is, not independently), e.g., at substantially the same speed. The clutch assembly 12 can be operable to selectively interlock the sleeve 64 and the support shaft 66. The clutch assembly 48 can include a clutch basket 84 fixed for rotation with the support shaft 66. The clutch assembly 12 can also include a clutch pack 86. The clutch pack 86 can include a first subset of plates 88 fixed for rotation with splines 89 on the sleeve 64 and a second subset of plates 90 fixed for rotation with splines 91 the clutch basket 84 and the support shaft 66. The plates 88, 90 can be coated in friction material or plates of friction material can be positioned adjacent plates 88, 90. The clutch basket 84 and the support shaft 66 can be interconnected through a fifth set of splines 92 defined by the clutch basket 84 and a sixth set of splines 94 defined by the support shaft 66. The third set of splines 80 and the sixth set of splines 94 of the support shaft 66 are spaced from one another along the axis 56.

A housing 96 defining an interior cavity 98 can contain at least a portion of the clutch assembly 68. The interior cavity 98 can be eccentric with respect to the sleeve aperture 50 and the support shaft aperture 78. This eccentricity is shown in FIG. 4 by the difference in the gap between the clutch basket 84 and the inner surface of the housing 96 between the top and bottom portions in FIG. 4.

The clutch assembly 12 can also include a piston 100 that receives fluid from the hydraulic control unit 16. The piston 100 can be positioned adjacent to a first end of the clutch pack 86. The clutch pack 86 can be positioned between the piston 100 and a portion of the clutch basket 84. The hydraulic control unit 16 can include a hydraulic control unit housing 110 having an accumulator housing portion 114 and a housing manifold portion 116. The accumulator housing portion 114 can define an accumulator chamber 124 with an accumulator piston 126. The accumulator housing portion 114 houses first and second biasing members 128A and 128B and the accumulator piston 126. The first and second biasing members 128A and 128B can be collectively referred to herein as a biasing assembly 130. The first biasing member 128A has a first spring rate while the second biasing member 128B has a second spring rate. The first and second spring rates cooperate together to provide a desired spring rate for the biasing assembly 130. As will become appreciated herein, fluid is pumped behind the accumulator piston 126 into the accumulator chamber 124 to cause the accumulator piston 126 to translate toward the first and second biasing members 128A, 128B.

In the hydraulic control unit 16 of the present disclosure, the accumulator chamber 124 houses the biasing members 128A, 128B and also provides a hydraulic sump 140. Such a configuration allows for reduced packaging space. The housing manifold portion 116 can define various fluid passages configured to provide access to various sensors. The hydraulic control unit 16 can also comprise a motor 150 that is coupled to the hydraulic control unit housing 110.

The motor 150 can operate a piston pump or gerotor gear assembly and can be conventionally constructed. The gerotor gear assembly can comprise an inner gerotor gear and an outer gerotor gear. The operation of the gerotor gear assembly can be conventional where relative rotation of the inner and outer gerotor gears can cause pumping action on the fluid contained in the hydraulic control unit housing 110. In examples where a piston pump is used, the piston pump can cause a pumping action on the fluid contained in the hydraulic control unit housing 110. The pumping action ultimately causes the fluid to be pumped into the accumulator chamber 124. In doing so, the biasing members 128A, 128B at least partially collapse and introduce a pre-charge into the system. In this regard, the motor 150 is not required to run constantly. The fluid pressure can be introduced into the clutch assembly 12 by the biasing members 128A, 128B acting on the accumulator piston 126.

The axle 32 and the differential assembly 24 can be interconnected through a first slippable linkage. The first linkage can be defined by the first housing 50, the pinion gears 52, and the side gear 54. The axle 32 and the differential assembly 24 can also be coupled through a second linkage being operable to selectively and positively lock the axle 32 and a portion of the differential assembly 24 together. The second linkage can be defined by the sleeve 64, the support shaft 66, and the clutch assembly 12. The second linkage can be connected to the axle 32 at a position spaced from the differential assembly 24.

The first linkage can thus be positioned within the second housing 58, and the clutch assembly 12 can be positioned within the housing 96. The second housing 58 can include a seal boss 160. The housing 96 can include a first portion 162 that abuts the seal boss 160 and a second portion 164 that at least partially surrounds the seal boss 160.

The first and second subset of plates 88 and 90 are interleaved between one another and act to rotate past one another in substantially non-contacting relationship when the clutch pack 86 is in its open position. However, it will be appreciated by those skilled in the art that the term "noncontacting" as used herein is relative and is not meant to necessarily indicate that the first and second subset of plates 88 and 90 have absolutely no contact when the clutch pack 86 is in the open condition. The first and second subset of plates 88 and 90 are axially movable into frictional engagement relative to one another, thereby reducing relative rotation between the first and second subset of plates 88 and 90 when the clutch pack 86 is in the closed or partially closed configurations. In this manner, when the clutch pack 86 is in its closed position, the side gears, as well as the axle shafts and the drive wheels rotate together.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An electronic limited slip coupling comprising:
    a sleeve having a first set of splines projecting inwardly and meshed for engagement with an axle;
    a support shaft having a second set of splines configured to mesh with a first housing of a differential assembly;
    a hydraulic control unit having:
        an accumulator housing portion that houses a biasing assembly and an accumulator piston, the accumulator housing portion forming an accumulator chamber with the accumulator piston; and
        a motor that is configured to pump fluid into the accumulator chamber of the accumulator housing portion;
    a clutch assembly that receives fluid from the hydraulic control unit, the clutch assembly having a clutch pack positioned between a clutch piston and a portion of a clutch basket, the clutch assembly operable to selectively interlock the sleeve and the support shaft; and
    a case that supports the electronic limited slip coupling as an assembled unit, the case having a flange that defines apertures for receiving fasteners that threadably couple the electronic limited slip coupling to one of a front transfer case and a front transmission.

2. The electronic limited slip coupling wherein the clutch basket is fixed for rotation with the support shaft and at least partially encircling the sleeve.

3. The electronic limited slip coupling of claim 2 wherein the clutch pack includes a first subset of plates fixed for rotation with the sleeve and a second subset of plates fixed for rotation with the clutch basket.

4. The electronic limited slip coupling of claim 3 wherein movement of the clutch piston urges the clutch pack against a portion of the clutch basket.

5. The electronic limited slip coupling of claim 4 wherein the clutch basket and the support shaft are interconnected through a third set of splines defined by the clutch basket and a fourth set of splines defined by the support shaft.

6. The electronic limited slip coupling of claim 1 wherein the fluid pumped into the accumulator housing portion at least partially collapses the biasing assembly and introduces a pre-charge into the hydraulic control unit, wherein the biasing assembly is configured to expand and urge the accumulator piston in a first direction resulting in fluid being communicated from the hydraulic control unit and into the clutch assembly.

7. The electronic limited slip coupling of claim 1 wherein the one of the front transaxle and front transmission is configured for use in one of a front wheel drive vehicle and all-wheel drive vehicle.

8. The electronic limited slip coupling of claim 1, further comprising a second housing that encloses the first housing, wherein the axle extends from a first end inside both of the first housing and the second housing to a second end spaced from an interior cavity of the second housing.

9. The electronic limited slip coupling of claim 1 wherein the sleeve defines a sleeve aperture centered on and extending along an axis defined by the axle.

10. An electronic limited slip coupling comprising:
   an axle shaft that extends along an axle axis and is configured to meshingly engage a side gear of a differential assembly;
   a sleeve having a first set of splines projecting inwardly and meshed for engagement with the axle shaft;
   a support shaft having a second set of splines configured to mesh with a first housing of the differential assembly;
   a hydraulic control unit having:
      an accumulator housing portion that houses a biasing assembly and an accumulator piston, the accumulator housing portion forming an accumulator chamber with the accumulator piston, wherein the fluid pumped into the accumulator housing portion at least partially collapses the biasing assembly and introduces a pre-charge into the hydraulic control unit, wherein the biasing assembly is configured to expand and urge the accumulator piston in a first direction resulting in fluid being communicated from the hydraulic control unit and into the clutch assembly; and
      a motor that is configured to pump fluid into the accumulator chamber of the accumulator housing portion;
   a clutch assembly that receives fluid from the hydraulic control unit, the clutch assembly having a clutch pack operable to selectively interlock the sleeve and the support shaft; and
   a case that supports the electronic limited slip coupling as an assembled unit, the case having a flange that defines apertures for receiving fasteners that threadably couple the electronic limited slip coupling to one of a front transfer case and a front transmission.

11. The electronic limited slip coupling of claim 10 wherein the clutch pack includes a first subset of plates fixed for rotation with the sleeve and a second subset of plates fixed for rotation with the clutch basket.

12. The electronic limited slip coupling of claim 11 wherein the clutch assembly further comprises a clutch piston that urges the clutch pack against a portion of the clutch basket upon delivery of fluid from the hydraulic control unit.

13. The electronic limited slip coupling of claim 12 wherein the clutch basket and the support shaft are interconnected through a third set of splines defined by the clutch basket and a fourth set of splines defined by the support shaft.

14. The electronic limited slip coupling of claim 10 wherein the one of the front transaxle and front transmission is configured for use in one of a front wheel drive vehicle and all-wheel drive vehicle.

15. The electronic limited slip coupling of claim 10, further comprising a second housing that encloses the first housing, wherein the axle extends from a first end inside both of the first housing and the second housing to a second end spaced from an interior cavity of the second housing.

16. The electronic limited slip coupling of claim 10 wherein the sleeve defines a sleeve aperture centered on and extending along the axle axis.

* * * * *